Sept. 30, 1969    A. W. CARLSON ET AL    3,469,814
MIRROR SUSPENSION
Filed Feb. 15, 1968    3 Sheets-Sheet 1
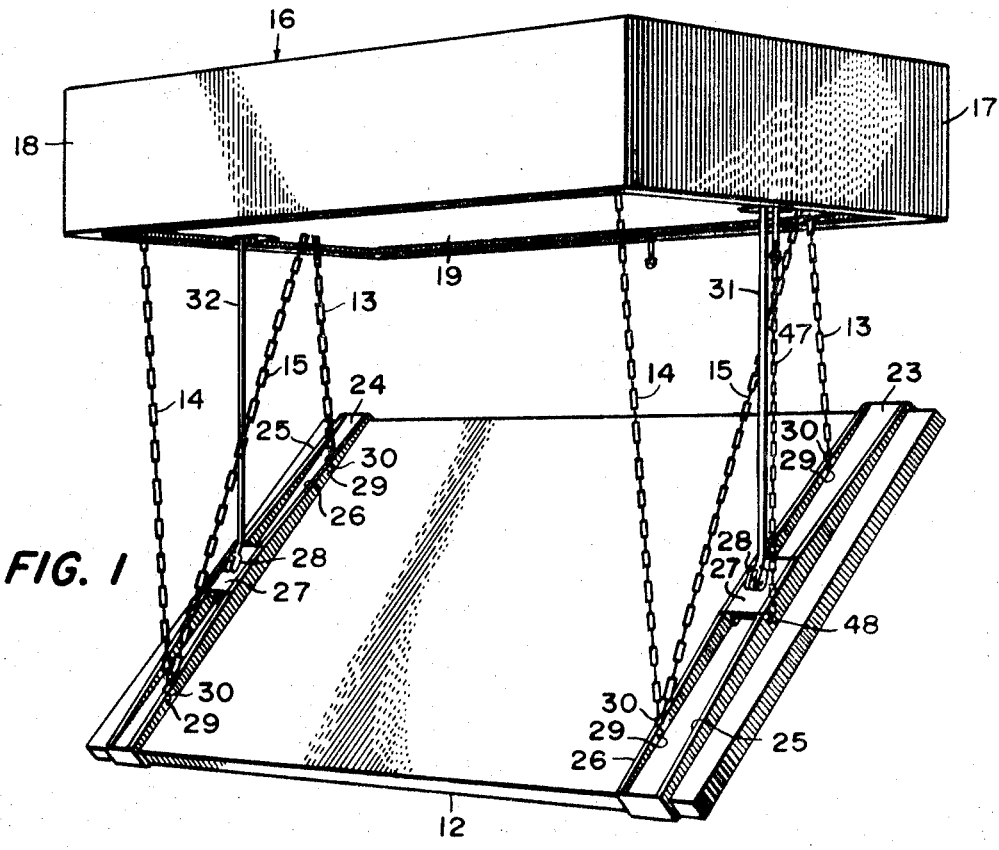
FIG. 1
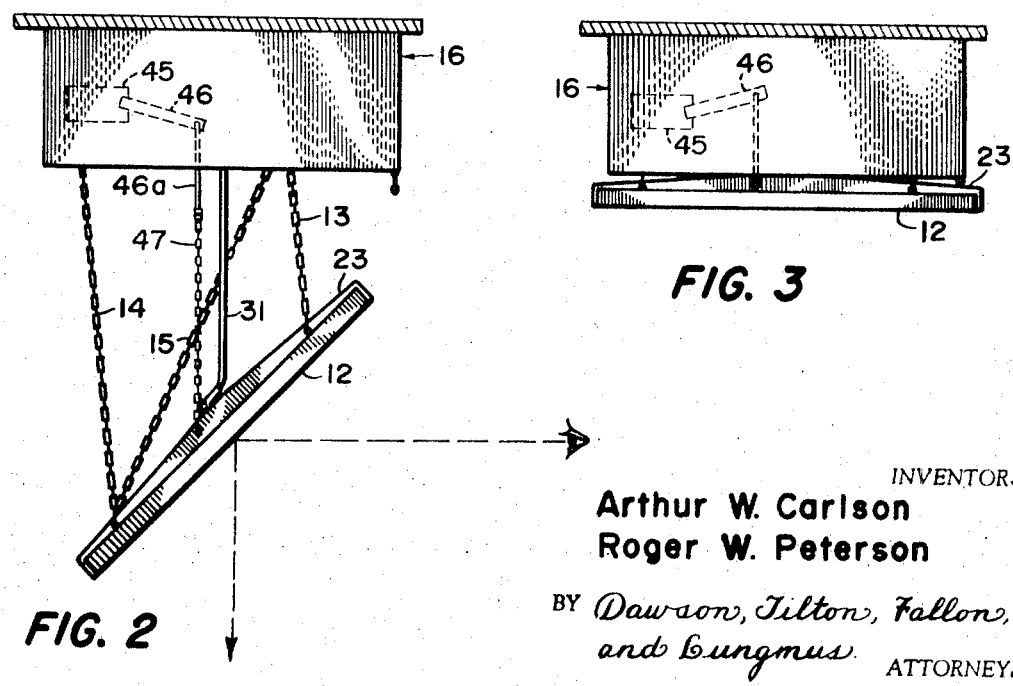
FIG. 2
FIG. 3
INVENTORS
Arthur W. Carlson
Roger W. Peterson
BY Dawson, Tilton, Fallon,
and Lungmus
ATTORNEYS Sept. 30, 1969   A. W. CARLSON ET AL   3,469,814
MIRROR SUSPENSION
Filed Feb. 15, 1968   3 Sheets-Sheet 2
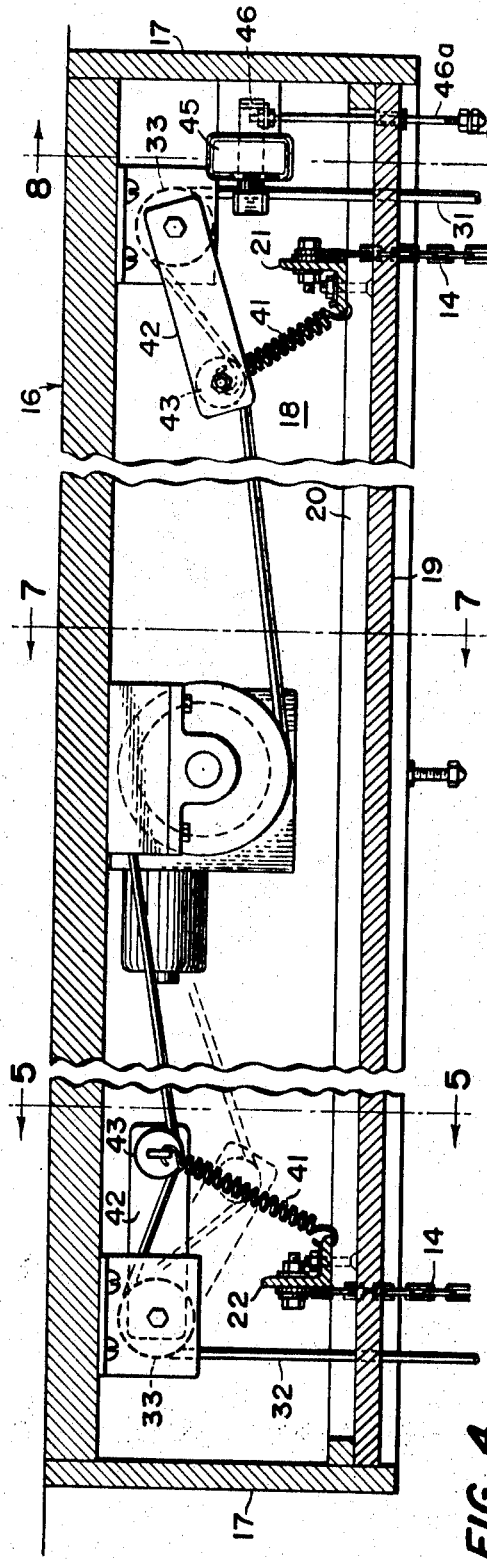
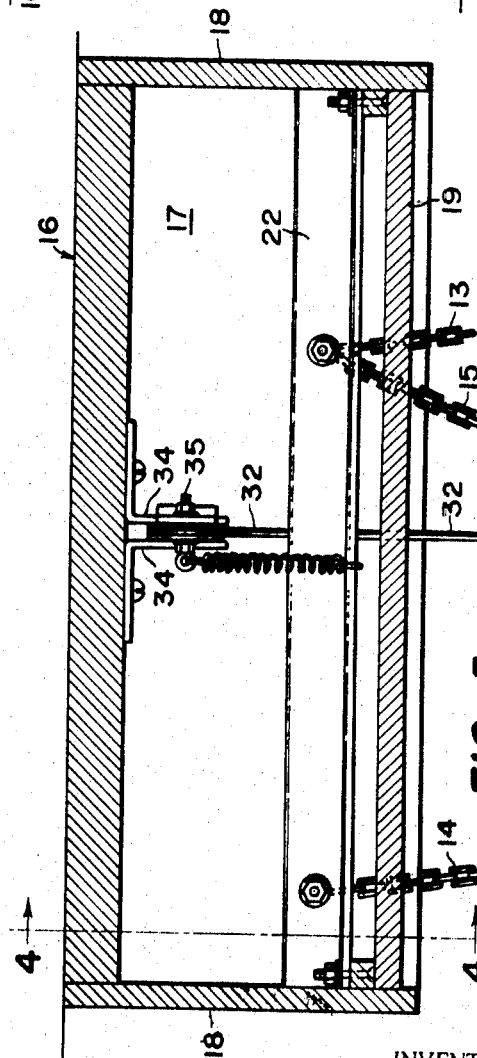
INVENTORS
Arthur W. Carlson
Roger W. Peterson
BY Dawson, Tilton, Fallon,
and Lungmus   ATTORNEYS INVENTORS
Arthur W. Carlson
Roger W. Peterson
BY Dawson, Tilton, Fallon, and Lungmus
ATTORNEYS

United States Patent Office 3,469,814
Patented Sept. 30, 1969

3,469,814
MIRROR SUSPENSION
Arthur W. Carlson and Roger W. Peterson, Muskegon, Mich., assignors to E. H. Sheldon & Company, Muskegon, Mich., a corporation of Michigan
Filed Feb. 15, 1968, Ser. No. 705,829
Int. Cl. A47g *1/16;* E04g *17/18;* B66c *23/60*
U.S. Cl. 248—492                                    7 Claims

ABSTRACT OF THE DISCLOSURE

A mirror is suspended over a demonstration area at an angle which permits the audience to view the demonstration. A support mounted upon the ceiling or room wall carries a power-driven reel upon which cables are wound, the outer ends of the cables being attached to the mirror. Also secured to the support are flexible suspension elements, such as chains, which have their lower ends secured to end portions of the mirror, the chains at one end being shorter than those at the other so that upon lowering the mirror, the suspension elements tilt the mirror and hold it against swinging in a desired reflecting position. When the cables are reeled in to raise the mirror in a preferred horizontal position, the chains fold inertly upon the top of the mirror and are carried by the mirror to the support structure. Limit switch means control the motor as the mirror reaches the desired lowered position and the desired raised position.

Background and summary

A mirror suspended at an angle is useful in enabling an audience, such as, for example, students in a classroom, to observe a demonstration or operation in an area below the mirror. Such a mirror, however, has to be a very large one and it has to be supported in a very accurate tilted position, while at the same time when the mirror is no longer needed, it must be raised quickly to a non-obstructing position near the ceiling or wall of the room. While motor-driven cables are effective in raising and lowering the heavy mirror, the cables are difficult to use in properly tilting the mirror, and there remains a problem of suspending the mirror quickly to the desired angle without oscillation and, after this is accomplished, it is necessary to restore the mirror to its raised position while concealing the suspension means.

In the structure which we have provided, inert suspension means, such as chains, etc., tilt and support the mirror in its lowered position automatically while, when the mirror is raised, the broad horizontal back of the mirror provides a space for the chain to fold or coil. At the same time, tension means are provided for the cables so that the mirror is lowered and raised evenly and smoothly, the cables preferably engaging the mirror in centered position so as to bring the mirror to a horizontal position below the support. The support is preferably in the form of a box in which the housing mechanism is concealed, and the lower wall of the box is apertured to provide openings for the cables and chains. Limit switches stop the operation of the motor when the mirror reaches the desired lowered position and the raised position.

Drawings

Figure 7:
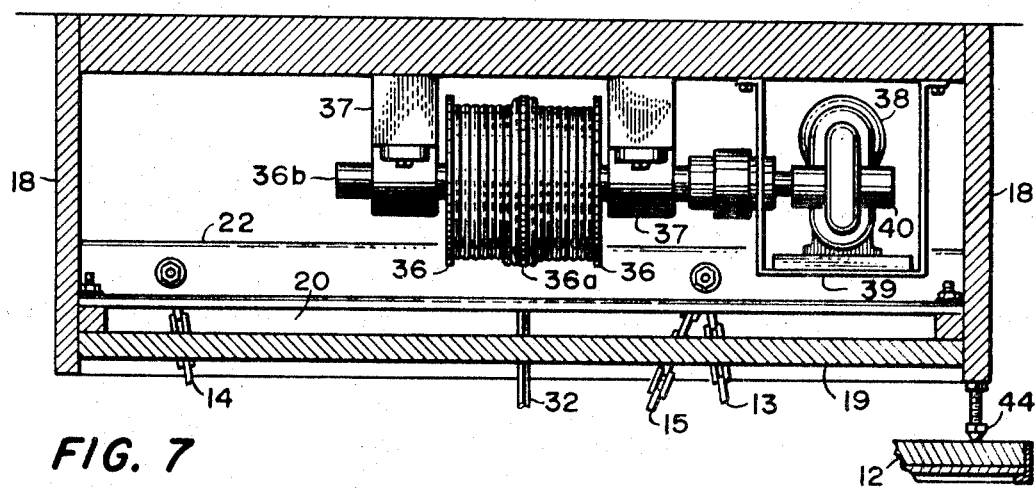

In the accompanying drawings, FIG. 1 is a perspective view of the mirror and support apparatus, the view being taken from the rear or non-viewing side thereof; FIG. 2, a side view in elevation of the structure shown in FIG. 1; FIG. 3, a view similar to FIG. 2 but showing the mirror in raised position; FIG. 4, an enlarged longitudinal sectional view, the section being taken as indicated at line 4—4 of FIG. 5; FIG. 5, a cross sectional view, the section being taken as indicated at line 5—5 of FIG. 4; FIG. 6, a side view in elevation on a reduced scale of the reflecting mirror shown in relation to a demonstration table or area; FIG. 7, a sectional view, the section being taken at line 7—7 of FIG. 4; FIG.. 8, a sectional view, the section being taken as indicated at line 8—8 of FIG. 4, and FIG. 9, a side view in elevation showing the mounting of the box above the ceiling.

Detailed description

Referring to FIG. 6, 10 designates a table and 11 designates a demonstration device or area. The mirror 12 is suspended over the demonstration area 11 and is shown supported by relatively short front chains 13, relatively long chains 14, and stabilizing diagonal chains 15. The chains are fixed to a wall support which is shown generally in the shape of a box 16.

It will be understood that the demonstration device or area 11 may be any operation or structure which is to be manipulated or viewed by persons in an audience who may be seated in a raised or ordinary classroom or hall, and the mirror 12 is supported in a tilted position providing the desired reflection for the audience.

The support 16 may be any suitable support structure on or above the ceiling or on a wall of the room. In the specific illustration given, the support is in the form of a box 17 having end walls 17a, sides 18, and a bottom wall 19 which is preferably removable. A support cleat or beam 20 is secured in the lower part of the box 16, and angle pieces 21 and 22 are supported thereon, as shown best in FIGS. 4 and 5. Pivotally mounted on the angles 21 and 22 are the short chains 13, the diagonal chains 15, and the long chains 14.

The chains 13, 14 and 15 are secured to the mirror structure in the following manner. Bracket members 23 and 24 are secured to the mirror for supporting the same, as shown best in FIGS. 1 and 2, each of the bracket members being in the form of channels having outer sides 25 and inner sides 26. At the center of each of the channel bracket members 24 and 23 are cross or bridge members 27, each having an eyelet to be received within the cable end fitting 28. A pin extends through the bifurcated end fitting to pivotally lock the end of the cable to the eyelet of the cross member 27.

The inner sides of each channel 23 and 24 are provided with spaced openings 29 which receive S hooks 30 at the ends of each of the chains. The cross members 27 are centered with respect to the mirror structure so that when the cable fittings are drawn upwardly, the mirror is suspended in a horizontal position.

The cables are designated by the numerals 31 and 32, the lower end of each cable being clamped within the cable end fitting 28. The cables extend upwardly over pulleys 33 which are mounted between bracket members 34 on pivots 35, as shown best in FIG. 5. The inner ends of the cables are wound about reels 36 spaced by a partition 36a on shaft 36b carried by brackets 37, as shown best in FIGS. 4 and 7. The reels may, of course, be operated manually or by motor or by any other suitable means. In the illustration given, an electric motor 38 is supported by bracket 39 and drives the reels through gear means and mounted within housing 40. It will be understood that any suitable reversing switch means for operating the reels for raising or lowering the mirror may be employed.

To provide for a smooth and even operation of the cables during the raising and lowering operations, we provide tension springs 41 secured at their lower ends to the angles 21 and 22 and having their upper ends secured to a lever arm 42. Upon each arm is mounted a pulley 43 which receives the cables 31 and 32, as shown best in FIG. 4.

Figure 8:
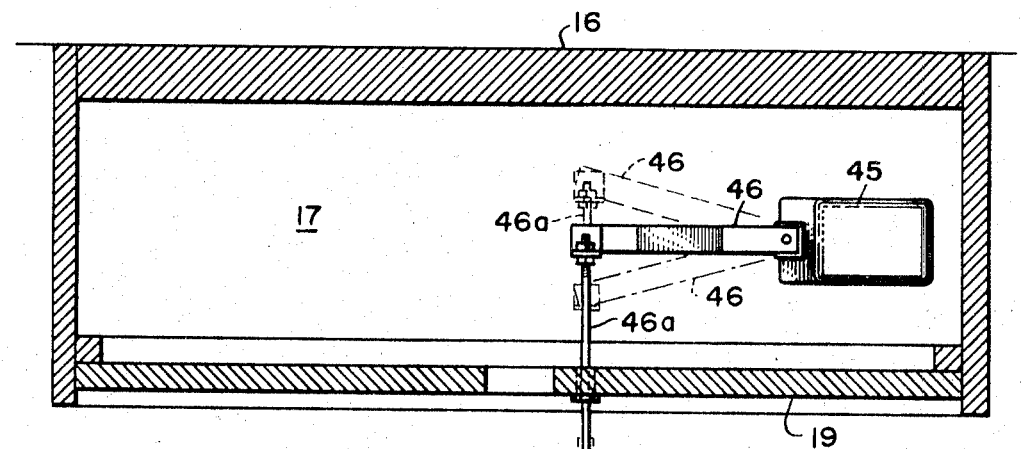

We provide a limit switch for automatically stopping the motor when it has reached the desired lowered position and also when it has reached the desired upper position. In FIG. 7 the mirror 12 is shown coming to level stored position against center bumper 44. The limit switch for the upper and lowered position is indicated by the numeral 45, and this switch has a pivotally-mounted finger 46 provided with a depending rod 46a secured to a small chain 47 which, in turn, is secured at its lower end to the mirror channel 25 at 48. As shown in FIG. 8, the finger 46 is in level position when the motor is running, in down position, as indicated in dotted lines, for stopping the mirror in down or use position and in upper position, as shown in dotted lines, for stopping the mirror in raised or stored position.

In the operation of the structure, when it is desired to lower the mirror 12 to an accurate reflecting position, the motor is started to pay out the cables 31 and 32, and the mirror lowers until the chains 13, 14 and 15 become taut, tilting the mirror to the position shown in FIG. 6 and supporting it against swinging and in fixed position. At this point, after the chains have taken over for supporting the mirror, the limit switch 45 is actuated by control chain 47 to stop the motor.

Figure 9:
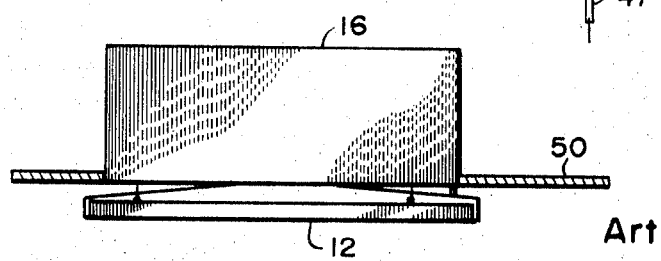

When the mirror is to be raised to close the bottom of box 16, the motor is operated to reverse the reels and to raise the cables 31 and 32. As the cables are raised, the mirror levels off and the chains inertly fold themselves upon the mirror surface and are concealed and housed adjacent the brackets 23 and 24. When the mirror engages the rod 46a and raises the finger 46, the motor is stopped. The raising and lowering movement is smooth and even due to the tensioning springs 41 and the engagement of the cables by the pulleys 43. The box 16 may be supported on the ceiling 50 of a room with its bottom flush with the bottom of the ceiling, as shown in FIG. 9.

While in the foregoing specification we have set out specific structure in considerable detail for the purpose of illustrating an embodiment of the invention, it will be understood that such details may be varied widely by those skilled in the art without departing from the spirit of our invention.

We claim:

1. In apparatus for suspending a mirror over a demonstration area, a fixed support, cable-equipped means mounted on said support for raising and lowering said mirror, said mirror having portions thereof secured to said cables for the lifting and lowering of said mirror, and flexible suspension elements fixed at their upper ends to said support and at their lower ends to ends of said mirror, said elements at one end of said mirror being shorter than the elements attached to the other end of said mirror whereby when said mirror is lowered to suspend it on said elements, the mirror is automatically tilted to a predetermined reflective position relative to said demonstration area.

2. The structure of claim 1 in which said suspension elements are inert and fold upon said mirror when the same is raised toward said support.

3. The structure of claim 1 in which a diagonal suspension element extends from the lower end of said mirror when the same is tilted to a rear end portion of said wall support to prevent oscillation of the mirror.

4. The structure of claim 1 in which each of said cables engages a pulley carried by a pivotally-mounted arm on said support and a tension spring normally draws said arm downwardly to tension said cable.

5. The structure of claim 1 in which said support comprises a box mounted on the ceiling in which said reel means are supported and said box is provided with a bottom wall apertured to receive said cables and suspension elements.

6. In apparatus for suspending a mirror over a demonstration area, a fixed suport, motor-driven reel means mounted on said support and equipped with cables, a mirror having center portions thereof secured to the lower ends of said cables for the lifting and lowering of said mirror in a horizontal plane, and flexible suspension elements fixed at their upper ends to said support and at their lower ends to the ends of said mirror, said elements at one end of said mirror being shorter than the elements attached to the other end of said mirror whereby when said mirror is lowered to suspend it on said elements, the mirror is automatically tilted to a predetermined reflecting position.

7. The structure of claim 6 in which said suspension elements are chains.

References Cited

UNITED STATES PATENTS 2,953,969  9/1960  Pepple _____ 350—288 X

ROY D. FRAZIER, Primary Examiner

FRANK DOMOTOR, Assistant Examiner

U.S. Cl. X.R.

35—58; 248—320; 254—144; 350—289